US008868143B2

(12) United States Patent
Ryann

(10) Patent No.: US 8,868,143 B2
(45) Date of Patent: Oct. 21, 2014

(54) GARMENT SECURABLE MOBILE DEVICE

(76) Inventor: William Frederick Ryann, San Antonio, TX (US)

( * ) Notice: Subject to any disclaimer, the term of this patent is extended or adjusted under 35 U.S.C. 154(b) by 1487 days.

(21) Appl. No.: 12/009,436

(22) Filed: Jan. 18, 2008

(65) Prior Publication Data
US 2008/0176611 A1 Jul. 24, 2008

Related U.S. Application Data

(60) Provisional application No. 60/881,758, filed on Jan. 22, 2007.

(51) Int. Cl.
*H04M 1/00* (2006.01)
*H04M 1/02* (2006.01)
*A41D 1/00* (2006.01)
*H04M 1/04* (2006.01)

(52) U.S. Cl.
CPC ............. *H04M 1/0216* (2013.01); *A41D 1/002* (2013.01); *H04M 1/04* (2013.01)
USPC .................. 455/575.6; 455/575.1; 455/575.3; 455/550.1; 361/679.27; 379/433.13

(58) Field of Classification Search
USPC ...................... 455/575.6, 575.1, 550.1, 575.3; 379/428.01, 433.13; 2/69, 129–250; 361/679.27, 679.03, 679.09, 679.26
See application file for complete search history.

(56) References Cited

U.S. PATENT DOCUMENTS

| 5,319,349 | A | * | 6/1994 | Smith, III | 340/7.63 |
|---|---|---|---|---|---|
| 5,890,634 | A | | 4/1999 | Zuckerman et al. | |
| 6,141,831 | A | | 11/2000 | Novin et al. | |
| 6,199,728 | B1 | * | 3/2001 | Cohen | 223/96 |
| 6,633,643 | B1 | | 10/2003 | Ona | |
| 6,854,415 | B2 | * | 2/2005 | Barnes et al. | 116/67 R |
| 6,886,221 | B2 | | 5/2005 | Minami et al. | |
| 7,121,439 | B2 | | 10/2006 | Gouldson et al. | |
| 7,251,323 | B2 | * | 7/2007 | Holtorf et al. | 379/433.13 |
| 7,525,533 | B2 | * | 4/2009 | Shibuya et al. | 345/163 |
| 7,565,720 | B1 | * | 7/2009 | Ligtenberg et al. | 16/366 |
| 7,843,052 | B1 | * | 11/2010 | Yoo et al. | 257/686 |
| 8,711,554 | B2 | * | 4/2014 | Griffin et al. | 361/679.27 |
| 2004/0090417 | A1 | * | 5/2004 | Amiri | 345/156 |
| 2004/0148740 | A1 | | 8/2004 | Arnone | |
| 2004/0237262 | A1 | | 12/2004 | Arnone | |
| 2005/0239520 | A1 | | 10/2005 | Stefansen | |
| 2005/0277452 | A1 | * | 12/2005 | Pasamba | 455/575.6 |
| 2006/0089181 | A1 | * | 4/2006 | Gartrell | 455/575.3 |
| 2010/0075717 | A1 | * | 3/2010 | Ou | 455/566 |

FOREIGN PATENT DOCUMENTS

JP   2000-253911   *   9/2000

* cited by examiner

*Primary Examiner* — Nay A Maung
*Assistant Examiner* — Angelica M Perez

(57) ABSTRACT

A mobile device for securing to a garment of a user thereof. Such a garment securable mobile device may be of a clamshell configuration with mating portions hinged to one another such that when closed toward one another a garment space is defined therebetween. A portion of a garment may be retained in the garment space thereby securing the mobile device to the garment. Retention of the garment portion may be enhanced by the use of gripping elements at the inner surfaces of one or both of the mating portions. A garment particularly configured for securing such a garment securable mobile device may also be provided.

20 Claims, 4 Drawing Sheets

GARMENT SECURABLE MOBILE DEVICE

CROSS REFERENCE TO RELATED APPLICATION(S)

This Patent Document claims priority under 35 U.S.C. §119(e) to U.S. Provisional Application Ser. No. 60/881,758, Garment Securable Mobile Device (William F. Ryann), filed on Jan. 22, 2007, which is incorporated herein by reference.

BACKGROUND

Embodiments described relate to mobile devices for securing directly to a garment of a user without the requirement of a mobile device carrier. In particular, embodiments relate to mobile devices of a clamshell configuration.

BACKGROUND OF THE RELATED ART

Mobile devices are experiencing a dramatic growth in utilization. In the case of mobile audio devices, an evolution from transistor radios, televisions and mobile cassette players to more modern communication devices such as the mobile cell phones of today has taken place. Mobile cell phones in particular have become more affordable and available, contributing to a boom in their usage. At one time a select group of individuals made regular use of cell phones. Now a significant percentage of people in the industrialized world own and/or make regular use of cell phones or other mobile devices for communication on a daily basis.

Improvements in mobile device functionality have further contributed to the boom in regular mobile device usage. In the case of cell phones, service areas have grown dramatically. Furthermore, it is even becoming commonplace for mobile devices to incorporate various types of functionality into a single device. For example, today's cell phones often incorporate picture taking, calendaring, e-mailing, internet web browsing, digital music and other features. This growth in functionality has led to an increased reliance on mobile devices. For example, access to a user's mobile device is increasingly becoming the primary means of access to that particular user's pictures, music and other personal information. Therefore, mobile device users are prone to have their mobile device regularly on their person on a daily basis.

In order for users to accommodate the mobile device on their person a variety of mobile device carriers or securing mechanisms have been developed. Such mobile device carriers may be a case, pouch, or other securing mechanism for retaining the mobile device therein. The carrier may then be secured to a garment of the user, such as at the user's belt. In this manner, the mobile device may be accommodated on the user's person in a hands free fashion and available for manual use at the user's discretion. Thus, the user may avoid less accessible means of transporting the mobile device such as cramming it in a pocket or leaving it strewn about the inside of a purse.

Unfortunately, while providing an added degree of accessibility to the mobile device as compared to a conventional garment pocket or purse, mobile device carriers such as the above described case or pouch still require that the mobile device be released therefrom in order to be employed by the user. For example, this may require physically detaching the entire mobile device and carrier from the garment in order to make use of the mobile device. Alternatively, the carrier itself may need to be physically opened in order to release the mobile device for use. In the case of a mobile cell phone, time spent releasing the phone often results in dropped calls and may distract the user from other important tasks such as driving.

In addition to problems associated with retrieval of a mobile device for use when retained by a mobile device carrier, the carrier itself may be a cumbersome accessory. For example, when located at the user's belt, the natural bending and turning of the user's waist forces the mobile device and carrier regularly against the user's waist and lower torso. As a result, extended use of such a securing mechanism can be quite uncomfortable, especially for users of greater girth. Therefore, at present users often continue to cram their cell phones or other mobile devices into their pockets, leave them strewn about inside purses or fail to carry them on their person at all in order to avoid the cumbersome and often uncomfortable nature of the above described mobile device carriers.

SUMMARY

A mobile device is provided for securing to a garment of a user. The mobile device includes a main body mating portion having an extension mating portion hinged thereto. The extension mating portion may close over the main body mating portion defining a garment space therebetween. A portion of the garment may be retained in the garment space thereby securing the mobile device to the garment.

DETAILED DESCRIPTION

Embodiments are described with reference to certain types of mobile devices. These may include clamshell mobile phone configurations as shown in FIGS. 1-4. However, other embodiments of mobile devices may be employed with a variety of mobile device functionalities. For example, mobile devices may be employed which operate as digital cameras, text messengers, digital music players, electronic calendars, internet web browsers, or a host of personal information storage devices.

Figure 1:
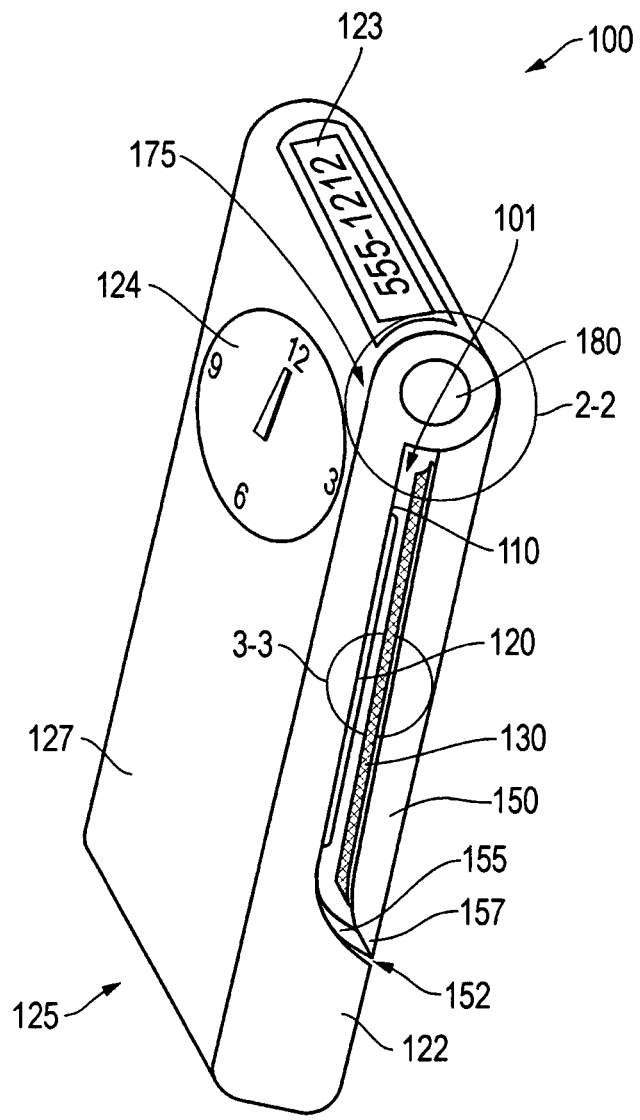
FIG. 1 is a side perspective view of an embodiment of a garment securable mobile device.

Referring now to FIG. 1, a side perspective view of an embodiment of such a mobile device for securing to a garment is shown in the form of the garment securable mobile device (GSMD) 100. The GSMD 100 includes mating portions 125, 150 coupled at a hinge 180. For sake of discussion, the larger mating portion apparent in FIG. 1 may be referred to herein as a main body 125 of the GSMD 100 while the smaller mating portion may be referred to as an extension 150. Regardless, these mating portions 125, 150 open and close relative to one another about the hinge 180.

The above described hinge 180 may be a multi-stable hinge that is stable in either an open position (not shown) or a closed position as shown in FIG. 1. In an open position, the GSMD 100 may be handheld. For example, in the embodiment shown, the GSMD 100 may be operated as a mobile phone. Thus, it may be opened and, with the main body 125 manually held in a user's palm, employed by the user for conventional phone use. Thus embodiments described herein include a GSMD 100 that displays a utility inherent to its open position such as the noted communicative utility, data entry, or data access. Additionally, utility inherent to its closed position may be present such as securing to a user's person as described below.

While configured for interactive use in an ergonomically practical manner, the GSMD 100 is also configured for carriage on a user's person in an ergonomically practical manner. As such, when the mating portions 125, 150 are stably closed toward one another to the position shown in FIG. 1, a garment space 101 is defined therebetween. With added reference to FIG. 4, this garment space 101 is especially configured to substantially stably accommodate a portion of a garment 400. That is, as described further herein, the GSMD 100 is configured to allow the mating portions 125, 150 to stably clamp onto a portion of a garment 400 such that the portion is substantially stably accommodated within the garment space 101. In this manner, the entire GSMD 100 may be secured to the garment 400.

Figure 4:
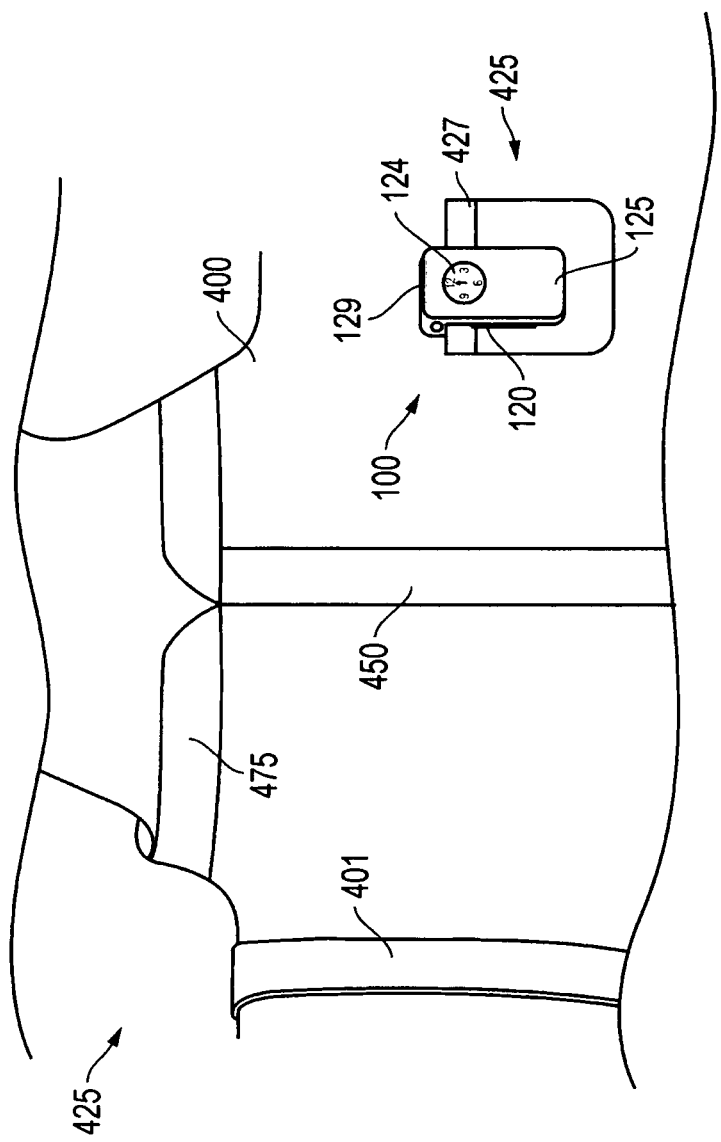
FIG. 4 is a front perspective view of the garment securable mobile device of FIG. 1 secured to a garment.

Continuing with reference to FIGS. 1 and 4, the garment space 101 is defined by the inner surfaces of the mating portions 125, 150 as indicated. In the embodiment shown, the GSMD 100 is a mobile phone. Therefore, the inner surfaces of the mating portions 125, 150 may include a host of features such as a keypad, internal display screen, or other interactive features. However, in the embodiment shown, the mating portions 125, 150 also include gripping elements 120, 130 for stabilizing the GSMD 100 relative to a portion of a garment 400 as described further herein. The gripping elements 120, 130 may be in the form of a gripping plateau 130 or gripping ridge 120. These elements 120, 130 may include positioning along at least two opposite inner sides of a given mating portion 125, 150. Furthermore, in addition to other benefits described below, the gripping elements 120, 130 may be of a profile to shield the noted interactive features from any portion of the garment 400 retained within the garment space 101.

In the embodiment shown, the main body 125 includes a gripping ridge 120 secured to the inner surface 110 of the main body 125 whereas the extension 150 includes a somewhat wider gripping plateau 130 adjacent thereto. As such, a portion of a garment 400 may be secured therebetween. However, in other embodiments only a single gripping element 120 or 130 or type may be employed. Additionally, the gripping elements 120, 130 may be employed interchangeably. Regardless, such gripping elements 120, 130 may help to further define the garment space 101 as shown in FIG. 1.

As described above, the garment space 101 is defined in a depth-wise dimension by the substantially parallel mating portions 125, 150 when closed about the hinge 180 toward one another. Additionally, in a longitudinal dimension, the garment space 101 runs from adjacent the hinge 180 to an interface 152 of the mating portions 125, 150 at a location opposite the hinge 180. That is, with respect to the particular embodiment of FIG. 1, a base 122 of the main body 125 meets a terminus 157 of the extension 150 at the interface 152 as these mating portions 125, 150 are positioned closed or clamped toward one another. Such a configuration allows the garment space 101 to remain open at the sides of the GSMD 100 and at the interface 152. As a result, a portion of a garment 400 accommodated by the garment space 101 may be continuous with the remainder of the garment 101 as the GSMD 100 is secured thereto. That is, with particular additional reference to FIG. 4, a garment 400 may include a portion that is pocket material 425 running into and out of the garment space 101, remaining continuous with garment 400, and allowing the GSMD 100 to independently clamp itself thereabout.

The GSMD 100 may be equipped with additional features in light of it's clamping nature relative to a portion of a garment 400 as indicated above with reference to FIG. 4. For example, the GSMD 100 may be equipped with an arcuate region 175 at the interface of the main body 125 and the hinge 180. The arcuate region 175 may be a portion of the main body 125 at the indicated interface that arcs in the direction of the extension 150 so as to position the hinge 180 away from a midline of the main body 125. In this manner, the hinge 180 may be displaced or positioned so as to affect the size of the garment space 101 for accommodating a portion of a garment 400 as shown in FIG. 4. That is, the location of the hinge 180, in addition to its diameter, geometry of the mating portions 125, 150, and the interfacing of the base 122 and the terminus 157 plays a role in defining the dimensions of the garment space 101. Thus, the arcuate region 175 may be configured to affect the dimensions of the garment space 101 as opposed to altering or increasing the size of the hinge 180.

As indicated above, the dimensions of the garment space 101 may be affected by a variety of factors such as the positioning of the hinge 180 and the interfacing of the base 122 and the terminus 157 (i.e. at the interface 152). Additionally, the interface 152 may be configured to accommodate pocket material 425 as shown in FIG. 4 and indicated above. As such, the terminus 157 may include a sloped surface 155 for guiding the garment portion into the garment space 101. That is, as shown in FIG. 4, the garment portion includes a piece of pocket material 425. Thus, the extension 150 may be positioned to slide into the pocket with the guidance of the sloped surface 155, thereby inserting the pocket material 425 into the garment space 101 for securing of the GSMD 100 thereat.

Continuing with reference to FIG. 1, visual display features 124, 129 may be accommodated by the GSMD 100 adding to its functionality. As shown, these may include a conventional watch face 124 at a main body surface 127 or a display screen 129 running laterally with the hinge 180. As described with reference to FIG. 4, placement of display features 124, 129 such as those shown may be established based on user preference in light of likely garment positions for securing the GSMD 100.

Figure 2:
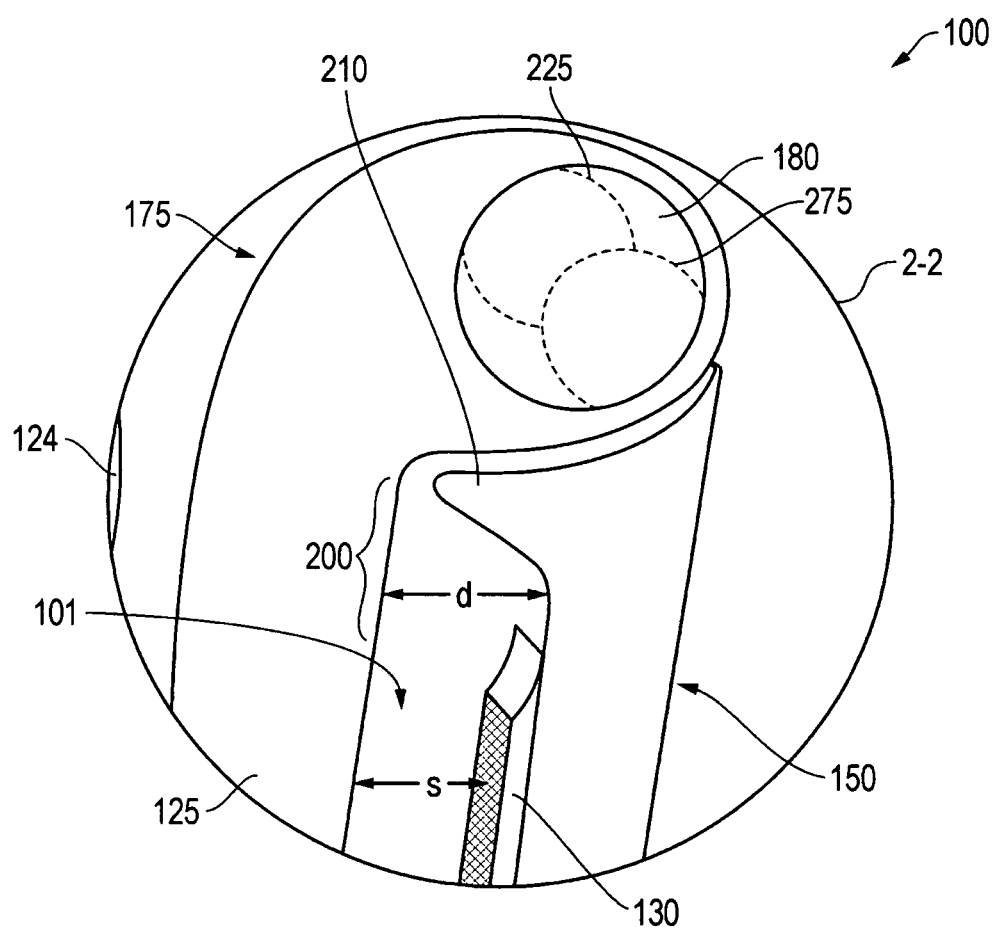
FIG. 2 is an enlarged view of a portion of the garment securable mobile device taken from 2-2 of FIG. 1.

Referring now to FIG. 2, an enlarged view of a portion of the GSMD 100 taken from 2-2 of FIG. 1 is shown. The garment space 101 is shown defined in part by a hinge stop 210. The hinge stop 210 is located adjacent the hinge 180 and between the mating portions 125, 150. In the embodiment shown, the hinge stop 210 runs contiguous with the extension 150. However, alternative coupling or positioning may be employed such as running contiguous with the main body 125 or hingedly coupled to the hinge 180 between the mating portions 125, 150.

The above-described hinge stop 210 may behave as a conventional stop with respect to establishing the closed position of the mating portions 125, 150 relative to one another. However, the hinge stop 210 is also configured in light of the garment portion to be accommodated within the garment space 101. For example, a user may seek to position the GSMD 100 vertically at a garment (i.e. see the GSMD 100 and pocket material 425 of FIG. 4). Where this is the case, the garment portion may gather to a degree adjacently below the hinge stop 210, for example, due to forces applied in positioning the GSMD 100 at the pocket material 425 as shown in FIG. 4. Thus, the hinge stop 210 may be configured to account for such gathering, for example to shield the hinge 180 and other features thereabove from any encroaching material of the garment portion.

As shown in FIG. 2, the garment space 101 is primarily defined by the mating portions 125, 150. For example, the garment space 101 is defined in one area by a gripping element 130 and an opposing mating portion 125 (i.e. note the separation (s) between the gripping plateau 130 and the main body 125). Similarly, in another area, the garment space 101 is defined solely by the surfaces of the opposing mating portions 125, 150 (i.e. note here the distance (d) between the extension 150 and the main body 125). This latter area may be referred to herein as a gathering area 200 of the garment space 101. As alluded to above, it is at the gathering area 200 immediately below the hinge stop 210 where a potential for gathering of a garment portion exists. However, as shown in FIG. 2, the distance (d) is the largest unencumbered portion of the garment space 101 between the mating portions 125, 150. Therefore, space is available for a degree of gathering. Furthermore, as detailed below, ample space is available at this location for a more rigid garment region 427 of potentially greater thickness and durability than other surrounding garment material.

As indicated above, a separation (s) is found between the gripping plateau 130 and the main body 125 beginning below the gathering area 200. In the embodiment shown, it is at this location that actual gripping of a garment portion within the garment space 101 may begin to take place as the GSMD 100 is clamped shut thereover. As detailed below, materials may be selected for the gripping plateau 130 which display appropriate frictional characteristics to enhance gripping of the garment portion at the location of the separation (s).

As shown in FIG. 2, and noted above, the hinge 180 is displaced away from the main body 125 in the direction of the extension 150 via an arcuate region 175. As indicated, this may be done in order to provide sufficient area to the garment space 101 without increasing the diameter of the hinge 180. The hinge 180 may also be of a dual configuration. That is, while the hinge is multi-stable in that it is stable in either an open position or a closed position, smaller conventional internal hinges 225, 275 may be provided such that the hinge 180 is also stable at an intermediate position that is neither fully closed nor fully opened. For example, upon closing of the extension 150 from a fully opened position, a first internal hinge 225 may be actuated until it reaches its own maximum closure, short of complete closure of the extension 150 (i.e. the indicated intermediate position). From this position additional force on the extension 150 by the user may actuate a second internal hinge 275, the rotation of which may effect complete closure of the extension 150 over the main body 125. The use of such a dual hinge configuration may allow the user to put the GSMD 100 at a stable intermediate position in advance of clamping the GSMD 100 over a garment portion. That is, the stable intermediate position provides a user friendly and practical manner of pre-positioning the GSMD 100 for example, in advance of inserting the extension 150 into a user's pocket and clamping the GSMD 100 closed thereover.

Figure 3:
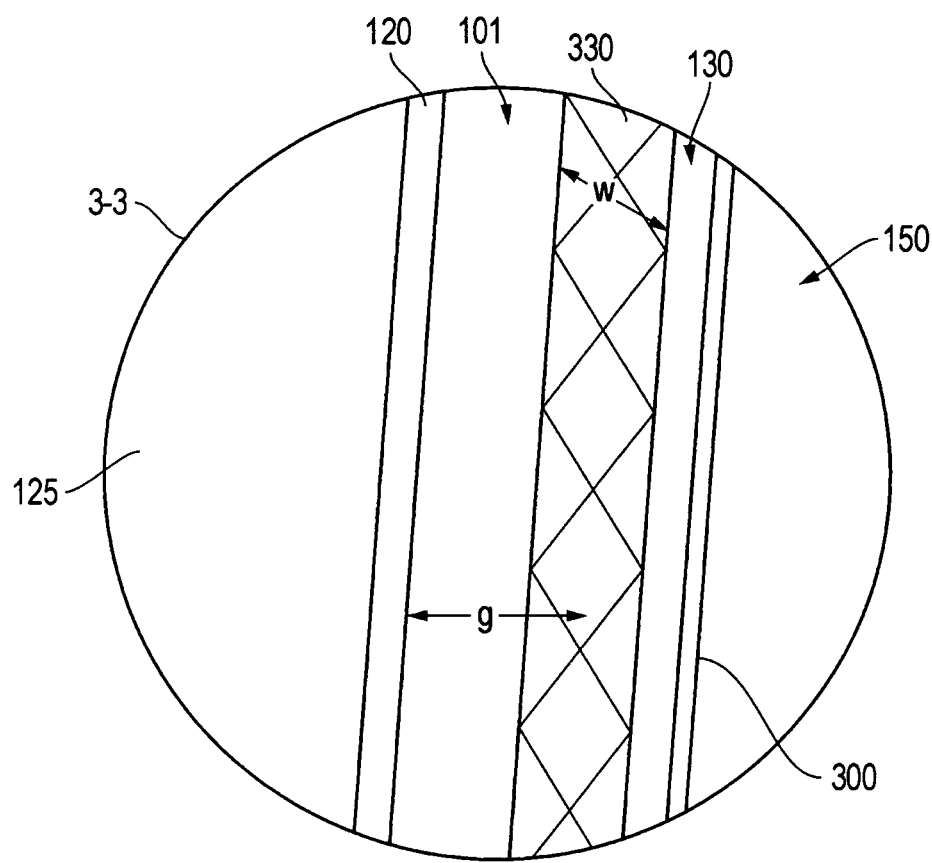
FIG. 3 is an enlarged view of another portion of the garment securable mobile device taken from 3-3 of FIG. 1.

The garment space 101 is described above with reference to locations between the main body 125 and the extension 150 such as the separation (s) and the distance (d). In the embodiment shown, the distance (d) may be between about 0.5 mm and about 5 mm with the separation (s) being less than the distance (d). Similarly, as shown in FIG. 3, a gap (g) between the main body 125 and the extension 150, as defined by the gripping plateau 130 and a gripping ridge 120, is less than the separation (s). That is, FIG. 3 reveals an enlarged view of a portion of the GSMD 100 taken from 3-3 of FIG. 1 wherein the gap (g) between gripping elements 120, 130 is shown. As indicated above, the gripping elements 120, 130 may be closed toward one another for stabilizing the GSMD 100 relative to a portion of a garment 400 (see FIG. 4).

Continuing with reference to FIG. 3, the main body 125 includes the gripping ridge 120 secured thereto whereas the extension 150 accommodates the gripping plateau 130. However, as noted above, in other embodiments gripping elements 120 or 130 may be employed at only one of the mating portions 125, 150. However, as alluded to above, even in such circumstances, portions of gripping elements 120, 130 may generally be found running substantially parallel to one another at opposite sides of a given mating portion 125, 150. Additionally, the gripping elements 120, 130 may be employed interchangeably. For example, in one embodiment, both gripping elements 120, 130 take the form of a gripping plateau 130 as shown in FIG. 3. In the embodiment shown, however, the gripping plateau 130 is of a width (w) that is between about 2 mm and about 10 mm whereas the gripping ridge 120 is thinner in comparison thereto, perhaps between about 1 mm and about 4 mm.

As indicated above, and with added reference to FIG. 4, the gripping ridge 120 may be vertically aligned with a midline of the gripping plateau 130 in order to acutely wedge a portion of a garment 400 in the garment space 101 against the gripping plateau 130. In another embodiment, the gripping ridge 120 may differ from the gripping plateau 130 by the presence of projections running laterally across the surface width of the gripping ridge 120. Thus, the gripping plateau 130 may be considered comparatively smoother than the gripping ridge 120 that employs the teeth-like projections to again acutely wedge a portion of the garment 400 in the garment space 101 and against the gripping plateau 130.

The gripping elements 120, 130 are also configured to withstand regularly repeatable opening, closing and clamping shut of the GSMD 100 as described above. As such, the gripping elements 120, 130 may be constructed of a durable material such as thermoplastic rubber. Further, in order to avoid degradation of the coupling between each gripping element 120, 130 and its mating portion 125, 150, these features may actually be co-molded. That is, in one embodiment, each gripping element 120, 130 may be co-molded with the outer shell of its corresponding mating portion 125, 150 so as to provide a unitary assembly of each gripping element 120, 130 and mating portion 125, 150. In such an embodiment, rigid varieties of polyvinyl chloride, polyethylene, nylon, and polypropylene may be employed.

In addition to those materials described above, more flexible or tacky materials may be employed for construction of the gripping elements 120, 130. These materials may include a variety of copolymers, blends and polycarbonates. In particular, the gripping elements 120, 130 may be constructed of polystyrene, flexible polyethylene, styrene butadiene, flexible polyvinyl chloride, and flexible polypropylene for such embodiments.

Regardless of the material selected for the gripping elements 120, 130, a coefficient of friction may be provided at the surface thereof that is sufficient to substantially immobilize a garment portion within the garment space 101 when the GSMD 100 is clamped thereabout as described above (see also FIG. 4). In order to enhance the frictional properties of the gripping elements 120, 130, they may be treated to provide a relief texture to their surfaces. For example, embodiments off the gripping elements 120, 130 may be treated by conventional engraving, vapor honing, acid etching, and sandblasting techniques in order to increase the coefficient of friction displayed thereby.

With added reference to FIG. 4, certain features of the gripping elements 120, 130 may enhance the clamping capability of the GSMD 100 to a garment 400 as described above. However, the gripping elements 120, 130 may also include characteristics to minimize the possibility of impressions or other undesired physical effects to the garment 400 as a result of the clamping. For example, a geometrically patterned surface may be provided to the gripping elements 120, 130 which is configured to minimize the possibility of impressions into more delicate fabrics. In fact, in the embodiment shown, a cross-hatch pattern is provided at the surface of the gripping plateau 130 in order to minimize its impact on a garment. In fact, as described below with reference to FIG. 4, the garment itself may include a rigid garment region 427 configured for retention within the garment space 101 without significant impact thereto in spite of the clamping action of the GSMD 100 thereupon as described.

Continuing with reference to FIG. 4, the GSMD 100 is shown secured to a garment 400 of a user 425. In particular, the GSMD is secured to a garment portion that is pocket material 425. That is, a garment portion of pocket material 425 is retained within the garment space 101 of the GSMD 100 as described above. However, the garment portion may include a variety of garment and material types. For example, in addition to the pocket material 425, the GSMD 100 of the embodiment shown may be secured to garment portions that include a shirt collar 475, a placket 450, or a strap 401, for example, of a purse, computer bag, seat belt, wristband or loop of material coupled to the garment 400 for securing the GSMD 100 thereat.

Regardless of the particular type of garment portion employed, the garment portion itself may be particularly configured for securing of the GSMD 100 thereto by means described above. That is, at least a segment of the garment portion (i.e. 401, 425, 450, 475) may be configured for secure retention within the garment space 101 described above (see FIGS. 1-3). For example, as indicated below, characteristics such as thickness, material type, frictional properties, durability, rigidity, and others may be selected for the garment portion that enhance the coupling of the GSMD 100 to the garment portion as described above.

As indicated above, in one embodiment, the pocket material 425 is equipped with a rigid garment region 427 having more rigidity than other portions of the garment 400 such as the remainder of the pocket material 425. With added reference to FIGS. 1-3, this may allow securing of the rigid garment region 427 within the garment space 101 without significant gathering as described above. Rather, the rigid garment region 427 may abut the hinge stop 210 and stably support the GSMD 100 in the position shown. Additionally, the pocket material 425, including the rigid garment region 427 (or other garment portions 401, 450, 475) may be of a thickness that is between about the distance (d) and the gap (g) as described above so as to ensure a substantially compatible and secure fit within the garment space 101 as detailed above.

Continuing with reference to FIG. 4, certain display features 124, 129 are shown incorporated within the GSMD 100. The placement of such display features 124, 129 may be established based on user preference in light of likely garment positions for securing the GSMD 100. For example, as shown, the GSMD 100 is vertically positioned when secured to the garment 400. Thus, the display screen 129 may read with the top thereof toward the main body 125 of the GSMD 100 (see also FIG. 1). In this manner, the user 425 may look down to read the display screen 129 with any information thereon naturally oriented for the user's perception thereof. Similarly, the watch face 124, which faces away from the user 425, may be naturally oriented for viewing by passers by as shown.

The placement and orientation of the display features 124, 129 may be modified where the user is to secure the GSMD 100 to other locations on the garment 400. For example, where the GSMD 100 is to be secured to the placket 450 in a lateral or horizontal manner, the watch face 124 may be positioned 90° from the orientation shown in FIG. 4. In this manner, the watch face 124 may remain naturally oriented for viewing by passers by in spite of the horizontal positioning of the GSMD 100. In fact, in one embodiment, the watch face 124 is rotable in 90° or other increments based on user preference to allow a change in positioning of the GSMD 100 on the garment 400 to leave the watch face 124 naturally oriented for viewing by passers by as described above.

The above described garment securable mobile device is equipped with an added degree of accessibility thereto when coupled to a garment. This degree of accessibility is greater than what would otherwise be available for a mobile device retained within a garment pocket, purse, or conventional mobile device carrier. The user may make use of the garment securable mobile device nearly instantaneously without undue time spent releasing from within a pant pocket, purse or carrier as described. This may in turn limit dropped calls and distraction from more important tasks such as driving or operating machinery generally. Furthermore, the garment securable mobile device may be used in a manner as to eliminate use of a cumbersome carrier therefor. This may lead to increased user comfort. Thus, improved accessibility and comfort may be achieved with use of the described garment securable mobile device without sacrifice to physical security and convenience of the device itself on the user's person.

Although exemplary embodiments describe particular configurations of a garment securable mobile device, additional embodiments are possible. Furthermore, many changes, modifications, and substitutions may be made without departing from the scope of the described embodiments. For a period following publication of this application and/or patent, a copy hereof may be made available at www.Licentia-IP.com.

I claim:

1. A handheld mobile device for mobile carriage on a user's person and comprising:
   a main body mating portion;
   an extension mating portion;
   a hinge coupling said mating portions, said mating portions for closing together about said hinge to define a garment space therebetween, the closing together of said mating portions of the device sufficient to independently sustain secure clamping of itself to a garment worn by the user, said extension mating portion having a sloped surface terminus at a location opposite the coupling thereof to said hinge; and
   at least one gripping element at an inner surface of at least one of said mating portions, said gripping element having a coefficient of friction sufficient for substantially immobilizing a portion of the garment within the garment space by wedging the garment portion therein upon the closing to attain the secure clamping.

2. The mobile device of claim 1 wherein the coefficient of friction is enhanced by one of engraving, vapor honing, acid etching, and sandblasting.

3. The mobile device of claim 1 wherein said at least one gripping element comprises a geometrically patterned surface to minimize physical effects to the garment portion from the accommodating.

4. The mobile device of claim 1 wherein said at least one gripping element is of a material selected from a group consisting of polystyrene, polyethylene, styrene butadiene, thermoplastic rubber, polyvinyl chloride, and polypropylene.

5. The mobile device of claim 1 wherein said at least one gripping element is formed integrally with an outer shell of the one of said main body and extension mating portions.

6. The mobile device of claim 5 wherein said at least one gripping element is of a material selected from a rigid polyvinyl chloride, a rigid polyethylene, a rigid nylon, and a rigid polypropylene.

7. The mobile device of claim 1 wherein said at least one gripping element is a first gripping element at an inner surface of said main body mating portion, the mobile device further comprising a second gripping element at an inner surface of said extension mating portion substantially parallel to said first gripping element.

8. The mobile device of claim 7 wherein one of said first gripping element and said second gripping element is a gripping ridge and the other of said first gripping element and said second gripping element is a gripping plateau, said gripping plateau being one of smoother and wider than said griping ridge.

9. The mobile device of claim 1 wherein said mating portion further comprises an interactive feature at the inner surface adjacent said gripping element, said gripping element of a profile to shield said interactive feature from the garment portion upon the closing.

10. The mobile device of claim 1 wherein said hinge is a multi-stable hinge.

11. The mobile device of claim 10 wherein said multi-stable hinge is of a configuration for stability in an intermediate position between a closed position and an open position of said mating portions thereabout.

12. The mobile device of claim 11 further comprising a hinge stop disposed between said mating portions adjacent said hinge and the garment space to establish the closed position and to shield the hinge from the garment position.

13. The mobile device of claim 1 wherein said hinge is displaced by an arcuate region of one of said mating portions to affect dimensions of the garment space.

14. The mobile device of claim 1 further comprising a functionality for use as one of a digital camera, text messenger, digital music player, electronic calendar, internet web browser, personal information storage device, and a phone.

15. The mobile device of claim 1 wherein said mating portions are distanced relative one another by between about 0.5 mm and about 5 mm upon the closing together.

16. A mobile device of a clamshell configuration to exhibit one of an open position and a closed position, the mobile device comprising:
a first mating portion;
a second mating portion;
a hinge coupling said first mating portion and said second mating portion and to effectuate the open position and the closed position of said mating portions thereabout, the mobile device to display capacity for interactive use by a user in the open position and to display capacity for securably and independently clamping itself to a garment of the user in the closed position, one of said mating portions having a sloped surface terminus at a location opposite the coupling thereof to said hinge; and
at least one gripping element at an inner surface of at least one of said mating portions, said gripping element having a coefficient of friction sufficient for substantially immobilizing a portion of the garment with the mobile device in the closed position by wedgably retaining the garment portion to attain the secure and independent clamping.

17. The mobile device of claim 16 wherein the capacity for interactive use includes one of data entry into the mobile device, data access from the mobile device, and communicative capacity with the mobile device.

18. The mobile device of claim 16 further comprising one of a visual display at one of said first mating portion, said second mating portion, and said hinge for use by the user when the mobile device is in the closed position.

19. The mobile device of claim 18 wherein said visual display is one of a watch face and a display screen.

20. The mobile device of claim 19 wherein the watch face is rotable.

* * * * *